United States Patent
Nautiyal et al.

(10) Patent No.: US 7,297,659 B2
(45) Date of Patent: Nov. 20, 2007

(54) SYNERGISTIC FERMENTED PLANT GROWTH PROMOTING, BIO-CONTROL COMPOSITION

(75) Inventors: Chandra Shekhar Nautiyal, Uttar Pradesh (IN); Sangeeta Mehta, Uttar Pradesh (IN); Harikesh Bahadur Singh, Uttar Pradesh (IN); Sunil Balkrishna Mansinghka, Nagpur (IN); Suresh Haribhau Dawle, Nagpur (IN); Naryan Eknath Rajhans, Nagpur (IN); Palpu Pushpangadan, Uttar Pradesh (IN)

(73) Assignee: Council of Scientific & Industrial Research, New Dehli (IN)

( * ) Notice: Subject to any disclaimer, the term of this patent is extended or adjusted under 35 U.S.C. 154(b) by 394 days.

(21) Appl. No.: 10/813,128

(22) Filed: Mar. 31, 2004

(65) Prior Publication Data

US 2004/0248738 A1 Dec. 9, 2004

Related U.S. Application Data

(60) Provisional application No. 60/458,372, filed on Mar. 31, 2003.

(51) Int. Cl.
*A01N 63/02* (2006.01)
*A01N 65/00* (2006.01)
*C05F 3/00* (2006.01)

(52) U.S. Cl. ............... 504/102; 504/101; 504/117; 504/118; 424/537; 424/545; 424/115; 424/754; 424/761; 71/22

(58) Field of Classification Search ............... 504/102
See application file for complete search history.

(56) References Cited

U.S. PATENT DOCUMENTS

| | | | | |
|---|---|---|---|---|
| 3,165,394 A | * | 1/1965 | Anders | 71/8 |
| 5,856,526 A | * | 1/1999 | Sankaram et al. | 549/348 |
| 5,885,600 A | * | 3/1999 | Blum et al. | 424/405 |
| 6,231,865 B1 | * | 5/2001 | Hsu et al. | 424/739 |
| 6,511,674 B1 | * | 1/2003 | Arand et al. | 424/406 |
| 6,548,085 B1 | * | 4/2003 | Zobitne et al. | 424/725 |

OTHER PUBLICATIONS

Grainge et al. Handbook of Plants with Pest-Control Properties. p. xii-xiv, 17-18, 43-45. 1988.*
CABA abstract 2004:196804 (2004).*

* cited by examiner

*Primary Examiner*—John Pak
(74) *Attorney, Agent, or Firm*—Arent Fox LLP

(57) ABSTRACT

The present invention relates to a synergistic composition useful as plant and soil health enhancer, comprising urine, neem and garlic, individually or in all possible combinations, with the treatment showing it has the ability to stimulate accumulation of nutrients in the plant biomass, proliferation of plant growth promoting, phosphate solubilizing, abiotic stress tolerant and antagonists towards plant pathogenic fungi, control phytopathogenic fungi in the rhizosphere of plants, and enhances the total phenolic contents of the plants.

16 Claims, No Drawings

SYNERGISTIC FERMENTED PLANT GROWTH PROMOTING, BIO-CONTROL COMPOSITION

This application claims benefit of Provisional Application 60/458,372, filed on Mar. 31, 2003.

FIELD OF THE PRESENT INVENTION

The present invention relates to a synergistic composition useful as plant and soil health enhancer using cow urine and application thereof for promoting plant growth and controlling plant pathogenic fungi, said composition comprising urine, neem and garlic, individually or in all possible combinations, with the treatment showing stimulation of the accumulation of nutrients in the plant biomass, proliferation of plant growth promoting, phosphate solubilizing, abiotic stress tolerant and antagonists towards plant pathogenic fungi in the rhizosphere of plants, and enhances the total phenolic contents of the plants; further, a method of producing said composition thereof.

BACKGROUND AND PRIOR ART OF THE PRESENT INVENTION

Farming is the oldest wealth-creating business known to man. Current scientific strategies to maintain and improve yields in support of high-input agriculture place great emphasis on 'fail-safe' techniques for each component of the production sequence with little consideration of the integration of these components in a holistic, systems approach. Research for sustainable agricultural practices requires a far greater emphasis on such an approach than now is fashionable, despite all the rhetoric given politically to sustainability.

The populations of the world's poorest countries have been growing rapidly, increasing the demand for food. At the same time environmental degradation—both natural and man made—has reduced the ability of farmers to grow food in many areas. A lot has been written about the significant contribution due to "Green Revolution" and correctly so, especially considering our failure to control unsustainable population growth. Thanks due to the high yielding varieties we are still self-sufficient in rice and wheat, but for how long? Hardly any one argues that modern agriculture is sustainable. Besides, high input agriculture is increasingly recognized as an environment degrading and not profitable. We now recognize that technical progress may have social and environmental costs we cannot pay. People are now seriously concerned with the protection of the environment and even more about safeguarding their health. As now people realize that by consuming the standard agriculture based food products they are constantly taking in small quantities of poison of various kinds and much of this comes from the chemical pesticides that are used to produce food crops.

Modern farming requires large inputs of chemical fertilizer and stimulants to increase yields from hybrids. However for poor rural marginal farmers the use of chemical fertilizers and pesticides have made agriculture very expensive and to maintain yields in deteriorating soils increasing doses of modern chemical inputs have had to be used. The time has now come to consider alternative means of sustaining our agriculture and to protect the farmer from low prices, high indebtedness and to ensure that production incentives remain. For small farmers, organic farming is most suitable as considerable vertical integration is possible and appreciable cost savings could be achieved through the recycling of waste and other materials that are available within the system.

A considerable amount of literature is available on the practice of organic farming. Where organic farming is practiced, the farmer will use natural processes to enhance productivity, maintain the nutritive status of the soil to be less dependent on external resources and to keep his costs down. This will strengthen his social and financial position in the society. Organic farming uses natural materials which are the by products of the farm and are environmentally safe, it enhances the nutritive qualities of the soil and it nurtures the organisms in the soils, which are generally destroyed by the use of chemical manures and pesticides, and significantly reduces cost. Therefore at this juncture further work on the development of agriculture biotechnology products based on cow offers immense potential as viable alternative for sustainable agriculture. We have observed serendipitously that when cow urine is applied to seedlings of plants, it enhances overall growth of the plant and protects plants from plant pathogenic fungi. Experiments were undertaken to investigate the significance of these observations. According to Hindu mythology as well as the Indian traditional agricultural practices Vrikshayurveda of Surapala, an ancient Sanskrit text on the science of plant life describes the use of milk in changing the flower color and enhancing fruit taste [N. Sadhale (1996) Surapala's Vrikshayurveda (translated by N. Sadhale) Secunderabad, India: Asian Agri-History Foundation]. Panchgavya, a mixture of five cow products namely, dung, urine, milk, curd and ghee (clarified butter) is used in human medicine, to improve soil health and to protect plants from diseases [S. N. Singh (1971) Krishi-Parashar (translated by S. N. Singh). Varanasi, India: Jai Bharat Press]. Systematic collection and use of urine for fertilization purposes only dates back approximately one century. More than 90% of the total N content in urine is $NH_4^+$-N. Also the K is predominantly present in inorganic form. This means that urine is comparable to commercial inorganic N and K fertilizer. The average K content in cattle urine is 0.7%, and when urine is applied to old grass sods strong effects are often seen—effects that have often been confused with an N effect—although it is primarily a K response.

Plants have remained central to every civilization as the primary source of life, due to their numerous applications in daily life. Plants are composed of chemical substances of which some are not directly beneficial for the growth and development of the organism. These secondary compounds have usually been regarded as a part of the plants' defense against plant-feeding insects and other herbivores [G. A. Rosenthal and D. H. Janzen (eds.) 1979 Herbivores: their interaction with secondary plant metabolites. Academic Press, New York]. The pesticidal properties of many plants have been known for a long time and natural pesticides based on plant extracts such as rotenone, nicotine and pyrethrum have been commonly used in pest control. Jacobson has reviewed literature on pesticides from more than 3000 plant species [M. Jacobson and D. G. Crosby (eds.) 1971. Naturally occurring insecticides. Dekker Inc. New York].

Neem (Azadirachta indica) is so far the most promising example of plants currently used for pest control. Neem has remained for numerous purposes in Indian society and is known since ancient times in Sanskrit as "Arishta" meaning health bestower. A summary of how neem products are used as bio-pesticides, the mode of action, effect on pests and natural enemies has been prepared by Schmutterer [H.

Schmutterer (1990) Annual Review of Entomology 35: 271-297]. Many agrochemical, therapeutic, and medicinal uses of neem are known [U. P. Singh and D. P. Singh (2002) Journal of Herbal Pharamcotherapy, 2: 13-28]. Disease caused by various microorganisms such as fungi, bacteria, and viruses not only damage the plant as a whole but also severely affect quality of the crop. A number of physiological and biochemical alterations in the plants have been reported due to infection of the fungi, bacteria, and viruses [H. Schmutterer. Neem products for integrated pest management.

In The Neem Tree: Source of unique natural products for integrated pest management, medicine and other purposes (Schmutterer, H., Ed.). VCH Verlagsgesellschaft, Weinheim, Germany. 1997; pp. 367-477]. Furthermore, control measures adopted to combat plant diseases have serious public concern because of the indiscriminate use of the synthetic pesticides. This has resulted in the intensive search to find the alternative methods for disease control and use of plant products in controlling plant pathogens could be a viable alternative [U. P. Singh and B. Prithiviraj (1997) Physiological and Molecular Plant Pathology 51: 181-194]. Aqueous extracts of various parts of neem, e.g., leaf, bark, seed, pulp and inflorescence have been used successfully in vitro to inhibit the growth of various plant pathogenic fungi [U. P. Singh, R. B. Singh, and H. B. Singh (1980) Mycologia 72: 1077-1093; U. P. Singh and H. B. Singh (1981) Australian Journal of Plant Pathology 10: 66-67].

Like neem, the antibacterial and antifungal properties of garlic (*Allium sativum* L) against human and plant pathogens are also well known [U. P. Singh, B. Prithviraj, B. K. Sarma, M. Singh and A. B. Ray (2001) Indian Journal of Experimental Biology 39: 310-322]. Oil of garlic in natural and synthetic forms has been reported to suppress the activity of many air and soil-borne fungi [N. B. K. Murthy and S. V. Amonkar (1973) Indian Journal of Experimental Biology 12: 208-209]. Several other workers have observed the antimicrobial activity of extracts of garlic [M. R. Tansey and J. A. Appleton (1975) Mycologia 67: 409-413; H. B. Singh and U. P. Singh (1981) Australian Journal of Plant Pathology 10: 66-67]. Singh et al. [U. P. Singh, K. K. Pathak, M. N. Khare and R. B. Singh (1979) Mycologia 71: 556-564] have shown that even garlic-leaf extract significantly reduced the growth of *Sclerotinia sclerotiorum* and *Fusarium oxysporum* f. sp. *ciceri*. Padwick causing wilts in gram (*Cicer arietinum* L.). Inhibition of growth and sclerotium formation in *Rhizoctonia solani* by garlic oil has also been reported [H. B. Singh and U. P. Singh (1980) Mycologia 72: 1022-1025].

Improving soil fertility is one of the most common tactics to increase agricultural and forest production. Soil organisms, especially bacteria have a key role in determining the rate of organic matter decomposition and thereby nutrient mineralization. These processes determine the rate of nutrient supply to primary producers, largely determining the rate of biomass production and other fundamental ecosystem processes like interactions among different functional groups of organisms that constitute ecosystems [J. D. Bever, K. M. Westover and J. Antonovics (1997) Journal of Ecology 85: 561-573]. Therefore, elucidation of the mechanisms that determine species composition in plant communities is important. Rhizobacteria, once considered passive bystanders of the root environment, are now known to affect plant health, development, and environmental adaptation, both beneficially and detrimentally, and the importance of these bacteria in agriculture is expected to grow [D. J. O'Sullivan and F. O'Gara (1992) Microbiology Review 56: 662-676; R. J. Cook (2000) Annual Review of Phytopathology 38: 95-116]. A variety of mechanisms have been identified as being responsible for such plant growth promoting activity. For example, certain microorganisms indirectly promote plant growth by inhibiting the growth of deleterious microorganisms; or directly enhance plant growth by producing growth hormones; and/or by assisting in the uptake of nutrients by the crops, e.g., phosphorus (P) [C. S. Nautiyal et al., FEMS Microbiology Letters, Volume 182, pp. 291-296 (2000)].

Plant disease suppression mechanisms involved includes antibiotic and siderophore-mediated suppression, and successful root colonization. A clear relationship has been established between the suppression of soil-borne diseases by bacteria and their densities in the rhizosphere [C. T. Bull, D. M. Weller and L. S. Thomashow (1991) Phytopathology 81: 954-959; B. J. Lugtenberg, L. Dekkers, L. and G. V. Bloemberg (2001) Annual Review of Phytopathology 39: 461-490]. We have observed that the effectiveness of plant growth-promoting rhizobacteria (PGPR) strains in controlling soil-borne plant pathogens is generally related to their efficiency of root colonization [C. S. Nautiyal (1997) Current Microbiology 33: 1-6; C. S. Nautiyal (1997) Current Microbiology 35: 52-58; C. S. Nautiyal (1997) FEMS Microbiology Ecology 23: 145-158; C. S. Nautiyal (2002) U.S. Pat. No. 6,495,362].

The ecology of rhizosphere competent bacteria is not yet well enough understood to predict the behavior and efficacy of PGPRs in phytosphere (leaf, stem, rhizosphere, and endorhizosphere) colonization and of the existence of crop specificity [C. S. Nautiyal (2000) In Biocontrol potential and its exploitation in sustainable agriculture. Edited by R. K. Upadhyay, K. G. Mukerji, and B. P. Chamola. Kluwer Academic/Plenum Publishers, New York. pp. 9-23]. Therefore, these findings suggest that rhizosphere microbial population is an important indicator of plant and soil health [C. S. Nautiyal, J. K Johri and H. B. Singh. Canadian Journal of Microbiology 48: 588-601 (2002)].

Microbial population studies can provide valuable information concerning the impact of introduced seed or soil treatment on indigenous microbial populations. Ideally, microbial population studies should be linked to broader aspects of ecosystem functioning, such as effects on plant growth, plant health, and nutrient cycling [M. N. Schroth and J. G. Hancock (1981) Annual Review of Phytopathology 35: 453-476; C. S. Nautiyal, J. K Johri and H. B. Singh. Canadian Journal of Microbiology 48: 588-601 (2002)]. Phenols have known to occur in all plants investigated so far. Some of them occur constitutively while others are formed in response to pathogen ingress and associated as part of an active defense response in the host [R. L. Nicholson and R. Hammerschmidt (1992) Annual Review of Phytopathology 30: 369-389]. There are also reports on a sudden increase in phenolic concentrations following inoculation with non-pathogenic organisms to the plants.

Direct reduction in fungal growth due to changes in phenolics in the tomato in response to inoculation with *Verticillium albo-atrum* is available in literature [M. A. Bernards and B. E. Ellis (1989) Journal of Plant Physiology 135: 21-26]. Seed bacterization with rhizobacteria results in greater accumulation of phenolic compounds or mediated induced systemic resistance (ISR) in hosts offer a practical way of immunizing plants against pathogen ingress [G. Wei, J. W. Klopper and S. Tazun (1991) Phytopathology 81: 1508-1512]. Recently we have reported rhizobacteria elicited alterations in phenolics of chickpea infected by *Sclero-*

*tium rolfsii* [B. K. Sarma, D. P. Singh, S. Mehta, H. B. Singh and U. P. Singh (2002) Journal of Phytopathology 150: 277-282].

Recently, effectiveness of cow's milk against zucchini squash (*Cucurbita pepo*) powdery mildew (*Sphaerotheca fulginea*) has been demonstrated in greenhouse conditions [W. Bettiol (1999) Crop Protection 18:489-492]. Cow milk may have more than one mode of action in controlling zucchini squash powdery mildew. Fresh milk may have a direct effect against *S. fulginea* due to its germicidal properties [A. J. Salle (1954) Fundamental principles of bacteriology. New York: McGraw-Hill]. Milk contains several salts and amino acids. These substances have been shown to be effective in controlling powdery mildew and other diseases [A. J. Salle (1954) Fundamental principles of bacteriology. New York: McGraw-Hill]. Several authors have shown that sodium bicarbonate, oxalate, dibasic or tribasic potassium phosphate, and other salts and amino acids have been efficient in the induction of systematic resistance [A. J. Salle (1954) Fundamental principles of bacteriology. New York: McGraw-Hill; van Andel (1966) Annual Review of Phytopathology 4:349-368; M. Reuveni, V. Agapov, R. Reuveni (1995) Plant Pathology 44:31-39].

India is one of the few countries in world, which has contributed richly to the International livestock gene pool and improvement of animal population in world. Cattle and buffalo contribute nearly 15% of the gross national income. The country possesses 23% of world bovine population. Sahiwal is one of the most popular breeds of cow of the subcontinent. It has been exported to Sri Lanka, Kenya and many countries in Latin America and West Indies where a new breed called Jamaica Hope has been evolved out of Sahiwal and Jersey crossbreeds [P. N. Bhat, Handbook of Animal Husbandry, Directorate of Publication and Information on Agriculture, Krishi Anusandhan Bhawan, Pusa, New Delhi, India (1997)]. Thus the traditional information about the use of cow urine an important bio matter which can be used methodically to get better result in controlling plant pathogenic fungi and promoting plant growth should not be ignored.

While work on use of urine for promoting plant growth and controlling plant pathogenic fungi has been conducted in past there has been no clear indication heretofore that any detailed study has been conducted to demonstrate that urine from cow might act as stimulator of the accumulation of nutrients in the plant biomass, proliferation of plant growth promoting, phosphate solubilizing, abiotic stress tolerant and antagonists towards plant pathogenic fungi in the rhizosphere of plants, and enhances the total phenolic contents of the plants, per se. Nevertheless, a cow urine-mediated promotion of plant growth and controlling plant pathogenic fungi, if one were discovered, could find immediate application, e.g., in soils affected by phytopathogens, poor nutrient availability in a desired improvement in crop development. We have found by direct comparison on a variety of plant types that the unique combination of selected plants with cow urine is effective in the enhancement of plant growth and soil health.

The present invention relates to usage of urine from cow which acts as plant and soil health enhancer and application thereof for promoting plant growth and controlling plant pathogenic fungi, said composition comprising urine, neem and garlic, individually or in all possible combinations, the treatment showing stimulation of the accumulation of nutrients in the plant biomass, proliferation of plant growth promoting, phosphate solubilizing, abiotic stress tolerant and antagonists towards plant pathogenic fungi in the rhizosphere of plants, and enhances the total phenolic contents of the plants; and a method for producing the composition.

OBJECTS OF THE PRESENT INVENTION

The main object of the present invention is to develop a synergistic fermented composition useful in promoting plant growth, soil health and bio-controlling.

Another object of the present invention is to develop a process of preparing synergistic fermented composition comprising cow urine, crushed neem leaves and/or crushed garlic bulbs, optionally along with carrier(s), useful in promoting plant growth.

Yet another object of the present invention is to develop a method of promoting plant growth using bovine urine and/or crushed neem leaves and/or crushed garlic bulbs, optionally along with carrier(s).

SUMMARY OF THE PRESENT INVENTION

The present invention relates to a synergistic composition useful as plant and soil health enhancer, comprising urine, neem and garlic, individually or in all possible combinations, with the treatment showing it has the ability to stimulate accumulation of nutrients in the plant biomass, proliferation of plant growth promoting, phosphate solubilizing, abiotic stress tolerant and antagonists towards plant pathogenic fungi, control phytopathogenic fungi in the rhizosphere of plants, and enhances the total phenolic contents of the plants.

DETAILED DESCRIPTION OF THE PRESENT INVENTION

Accordingly, the present invention relates to a synergistic fermented composition useful in promoting plant growth, soil health and bio-controlling, said composition comprising bovine urine; crushed neem leaves of concentration ranging between 10 to 750 grams/liter of bovine urine and/or crushed garlic bulbs of concentration ranging between 1 to 500 grams/liter of bovine urine, optionally along with carrier(s).

In still another embodiment of the present invention, wherein the concentration of neem is preferably 250 grams/liter of bovine urine.

In still another embodiment of the present invention, wherein the concentration of garlic is preferably 100 grams/liter of bovine urine.

In still another embodiment of the present invention, wherein the bovine urine is fresh bovine urine.

In still another embodiment of the present invention, wherein the bovine urine is cow urine.

In still another embodiment of the present invention, wherein the carrier is selected from a group comprising vermicompost, soil, peat, rice husk, vermiculite, carboxymethyl cellulose, perlite, polyvinyl-pyrrolidone, talc, and fermented pres mud.

In still another embodiment of the present invention, wherein the carrier is preferably vermicompost or fermented pres mud.

In still another embodiment of the present invention, wherein the concentration of carrier is ranging between 10 to 1000 gm/liter of bovine urine.

In still another embodiment of the present invention, wherein a process of preparing synergistic fermented composition comprising cow urine, crushed neem leaves of concentration ranging between 10 to 750 grams/liter of bovine urine, and/or crushed garlic bulbs of concentration ranging between 1 to 500 grams/liter of bovine urine, optionally along with carrier(s), useful in promoting plant growth, said process comprising steps of:

collecting fresh urine from healthy bovine, adding crushed garlic bulbs and neem leaves to the collected urine, fermenting resultant mixture of step (b) to obtain the synergistic composition, and optionally, adding carrier to the synergistic composition.

In still another embodiment of the present invention, wherein the concentration of neem is preferably 250 grams/liter of bovine urine.

In still another embodiment of the present invention, wherein the concentration of garlic is preferably 100 grams/liter of bovine urine.

In still another embodiment of the present invention, wherein the bovine is cow.

In still another embodiment of the present invention, wherein fermenting the resultant mixture for about 30 days.

In still another embodiment of the present invention, wherein the carrier is selected from a group comprising vermicompost, soil, peat, rice husk, vermiculite, carboxymethyl cellulose, perlite, polyvinyl-pyrrolidone, talc, and fermented pres mud.

In still another embodiment of the present invention, wherein the carrier is preferably vermicompost or fermented pres mud.

In still another embodiment of the present invention, wherein the concentration of carrier is ranging between 10 to 1000 gm/liter of bovine urine.

In still another embodiment of the present invention, wherein a method of promoting plant growth using bovine urine and/or crushed neem leaves of concentration ranging between 10 to 750 grams/liter, and/or crushed garlic bulbs of concentration ranging between 1 to 500 grams/liter, optionally along with carrier(s), said method consisting step of exposing plant part(s) to bovine urine and/or neem and/or garlic.

In still another embodiment of the present invention, wherein the concentration of neem is preferably 250 grams/liter.

In still another embodiment of the present invention, wherein the concentration of garlic is preferably 100 grams/liter.

In still another embodiment of the present invention, wherein the bovine is cow.

In still another embodiment of the present invention, wherein the garlic and/or neem is crushed in urine or water.

In still another embodiment of the present invention, wherein the carrier is selected from a group comprising vermicompost, soil, peat, rice husk, vermiculite, carboxymethyl cellulose, perlite, polyvinyl-pyrrolidone, talc, and fermented pres mud.

In still another embodiment of the present invention, wherein the carrier is preferably vermicompost or fermented pres mud.

In still another embodiment of the present invention, wherein the concentration of carrier is ranging between 10 to 1000 gm/liter of bovine urine.

In still another embodiment of the present invention, wherein the method controls plant pathogenic bacteria.

In still another embodiment of the present invention, wherein the method promotes accumulation of nutrients in plant biomass.

In still another embodiment of the present invention, wherein the method promotes accumulation of nitrogen in plant biomass.

In still another embodiment of the present invention, wherein the method promotes accumulation of phosphorus in plant biomass.

In still another embodiment of the present invention, wherein the method promotes phosphate solubilization.

In still another embodiment of the present invention, wherein the method promotes abiotic stress tolerance.

In still another embodiment of the present invention, wherein the method promotes antagonists towards plant pathogenic fungi.

In still another embodiment of the present invention, wherein the method promotes antagonists towards plant pathogenic fungi in rhizosphere of plants.

In still another embodiment of the present invention, wherein the fungi are selected from a group comprising *Fusarium* sp., *Alternaria* sp., *Phytophthora palmivora*, *Sclerotinia sclerotiorum*, *Sclerotium rolfsii*, *Colletotrichum* sp., *Penicillium* sp., *Aspergillus niger*, *Rhizoctonia solani*, *Pythium aphamidermatum*, *Curvularia lunata*, and *Phoma sorghi*.

In still another embodiment of the present invention, wherein the method enhances total phenolic content of the plant.

In still another embodiment of the present invention, wherein the method protects plants from soil borne plant pathogens forming sclerotia/chlamydospores.

In still another embodiment of the present invention, wherein promoting plants growth by soil drenching.

In still another embodiment of the present invention, wherein promoting plants growth by aerial/foliar spray.

In still another embodiment of the present invention, wherein promoting plants growth by seed soaking.

In still another embodiment of the present invention, wherein promoting plants growth by furrow treatment.

In still another embodiment of the present invention, wherein the method stimulates proliferation of plant growth promoting microorganisms in the rhizosphere of plants.

In still another embodiment of the present invention, wherein the method stimulates proliferation of phosphorus solubilizing microorganisms in the rhizosphere of plants.

In still another embodiment of the present invention, wherein the method stimulates proliferation of abiotic stress tolerant microorganisms in rhizosphere of plants.

In still another embodiment of the present invention, wherein the neem and/or garlic and/or urine are in boiled state.

In still another embodiment of the present invention, wherein the plants are selected from a group comprising chickpea, maize, wheat, and pea.

In still another embodiment of the present invention, wherein the neem and/or garlic and/or urine in earthen and copper vessel promote plant growth.

In still another embodiment of the present invention, wherein the method using copper and/or earthen vessel promotes plant growth increases plant dry weight by about 110%.

In still another embodiment of the present invention, wherein the neem and/or garlic and/or urine is diluted in the ratio ranging between 1:5 to 1:1000.

In still another embodiment of the present invention, wherein the neem and/or garlic and/or urine is diluted preferably in the ratio of about 1:10.

In still another embodiment of the present invention, wherein the combination of neem, garlic, and urine is most effective in promoting plant growth.

In still another embodiment of the present invention, wherein the synergistic combination of neem, garlic, and urine show about 85% increase in wheat growth.

In still another embodiment of the present invention, wherein the method promotes plant growth by inhibiting sclerotia and chlamydospores of pathogenic fungi in about 2 to 4 hours.

In still another embodiment of the present invention, wherein the method promotes plant growth by protecting plant from soil-borne plant-pathogens.

In still another embodiment of the present invention, wherein the method promotes plant growth as combination of neem, garlic, and urine is showing 100% biocontrol activity against collar rot.

In still another embodiment of the present invention, wherein the method promotes plant growth by controlling leaf spot disease.

In still another embodiment of the present invention, wherein the method promotes plant growth by increasing dry weight of the plant by about 50%.

In still another embodiment of the present invention, wherein the method promotes plant growth by increasing nitrogen accumulation by about 50%.

In still another embodiment of the present invention, wherein the method promotes plant growth by increasing phosphorus accumulation by about 35%.

In still another embodiment of the present invention, wherein the method promotes plant growth by reducing pathogenic bacterial population by about 1 log unit.

In still another embodiment of the present invention, wherein the method promotes plant growth by reducing pathogenic fungal population by about 0.7 log unit.

In still another embodiment of the present invention, wherein the method promotes plant growth by reducing actinomycetes population by about 1 log unit.

In still another embodiment of the present invention, wherein the method promotes plant growth by increasing antagonism by about 150% towards fungi.

In still another embodiment of the present invention, wherein the method promotes plant growth by increasing abiotic stress tolerance by about 100%.

In still another embodiment of the present invention, wherein the method promotes plant growth by increasing phosphate solubilization by about 120%.

In still another embodiment of the present invention, wherein the method shows increase in gram-positive bacteria by about 40%.

In still another embodiment of the present invention, wherein the method shows decrease in gram-negative bacteria by about 20%.

In still another embodiment of the present invention, wherein the method shows increase in gram-positive bacteria.

In still another embodiment of the present invention, wherein the carrier increases plant growth by 30 to 50%.

In still another embodiment of the present invention, wherein the carrier increases antagonism towards plant-pathogenic fungi in the range of 30 to 45%.

In still another embodiment of the present invention, wherein the method promotes plant growth by increasing phenolic content in the range of 120 to 130%.

In still another embodiment of the present invention, wherein accordingly, the present invention relates to a synergistic composition useful as plant and soil health enhancer, comprising urine, neem and garlic, individually or in all possible combinations, with the treatment showing it has the ability to stimulate accumulation of N and P in the plant biomass, proliferation of plant growth promoting, phosphate solubilizing, abiotic stress tolerant and antagonists towards plant pathogenic fungi, control phytopathogenic fungi in the rhizosphere of plants and enhances the total phenolic contents of the plants.

In an embodiment of the present invention, a synergistic composition useful as plant and soil health enhancer, comprising urine and plants, individually or in all possible combinations.

In still another embodiment of the present invention, wherein urine is collected from a bovine group of animal comprising cow.

In still another embodiment of the present invention, wherein plants are selected from a group comprising neem and garlic.

In still another embodiment of the present invention, wherein amount of neem and garlic is about 250 gm and 100 gm/liter urine.

In still another embodiment of the present invention, wherein total amount of neem is 250 gm/liter urine and preferably 10-750 gm/liter urine.

In still another embodiment of the present invention, wherein total amount of garlic is 100 gm/liter urine and preferably 1-500 gm/liter urine.

In still another embodiment of the present invention, wherein said synergistic composition enhances plant growth.

In still another embodiment of the present invention, wherein plant for growth promotery activity is selected from a group comprising chickpea, maize, wheat and pea.

In still another embodiment of the present invention, wherein said synergistic composition protects plants from pathogens which has the potential as biopesticide for the biocontrol of wide host range of economically important pathogenic fungi.

In still another embodiment of the present invention, wherein pathogenic fungi for biological control activity is selected from a group comprising *Fusarium* sp., *Alternaria* sp., *Phytophthora palmivora*, *Sclerotinia sclerotiorum*, *Sclerotium rolfsii*, *Colletotrichum* sp., *Penicillium* sp., *Aspergillus niger*, *Rhizoctonia solani*, *Pythium aphamidermatum*, *Curvularia lunata* and *Phoma sorghi*.

In still another embodiment of the present invention, wherein said synergistic composition protect plants from soil borne plant pathogens forming sclerotia/chlamydospores.

In still another embodiment of the present invention, wherein said synergistic composition protects plants by seed soaking treatment, from seed borne plant pathogens.

In still another embodiment of the present invention, wherein said synergistic composition protect plants by soil drenching treatment, from plant pathogens.

In still another embodiment of the present invention, wherein said synergistic composition protect plants as an aerial spray from plant pathogens.

In still another embodiment of the present invention, wherein said synergistic composition is used with carriers to disperse the subject treatment, wherein preferred carriers are selected from a group comprising vermicompost and fermented press mud.

In still another embodiment of the present invention, wherein said synergistic composition enhances accumulation of nutrients in the plant biomass.

In still another embodiment of the present invention, wherein said synergistic composition stimulate proliferation of plant growth promoting microorganisms in the rhizosphere of plants.

In still another embodiment of the present invention, wherein said synergistic composition stimulate proliferation of phosphate solubilizing microorganisms in the rhizosphere of plants.

In still another embodiment of the present invention, wherein said synergistic composition stimulate proliferation of abiotic stress tolerant microorganisms in the rhizosphere of plants.

In still another embodiment of the present invention, wherein said synergistic composition stimulate proliferation of antagonists towards plant pathogenic fungi in the rhizosphere of plants.

In still another embodiment of the present invention, wherein said synergistic composition enhances the total phenolic contents of the plants.

The experiments were conducted using urine from Gir, Kankrej, Nagpur, Tharparkar, and Haryana cows. The difference in the plant biomass was within the range of 2%. By far, Sahiwal is the best breed of the subcontinent. Therefore, urine from Sahiwal cow was used for further work.

In still another embodiment of the present invention, applicants have discovered a novel method of using cow urine to select those plants that are useful as plant and soil health enhancer and showing the ability of the accumulation of nutrients in the plant biomass, proliferation of plant growth promoting, phosphate solubilizing, abiotic stress tolerant and antagonists towards plant pathogenic fungi in the rhizosphere of plants, and enhances the total phenolic contents of the plants.

The above-stated invention is further elaborated in the form of examples and should not be construed to limit to limit the scope of the invention 1. Collecting fresh urine from healthy indigenous (Sahiwal) cows in morning into clean plastic container. Pouring the 1 liter urine into 2 liter capacity either copper or earthen pot buried in soil up to its neck for its fermentation up to 30 days. After 30 days, using the fermented product either directly or boiling it to concentrate to 0.25 liter, before its application. In another combination fermenting cow urine along with neem (250 gm leaves/liter) and/or garlic (100 gm crushed bulbs/liter). In yet another combination fermenting neem and garlic with water. Thus preparing 12 treatments using urine, neem and garlic individually in copper or earthen pot, each, to a final total of 24 treatments.
2. Screening of 24 treatments prepared in step 1 in the greenhouse having potential for promoting plant growth as follows: growing chickpea plants in the presence of individual treatment as prepared in step 1 in the greenhouse in a concentration of about 1:100 dilution in non-sterile soil; growing control chickpea plants as above but without addition of the treatment; and selecting as plant growth promoter those treatments which cause the treated plants to exhibit greater dry weight.
3. Further evaluation of the treatment selected in step 2 as plant growth promotion ability of chickpea, maize, wheat and pea in greenhouse using different dilution in the range of 0 to 1:1000 and selecting those treatments which cause the treated plants to exhibit greater dry weight.
4. Screening the treatments urine+neem and urine+neem+garlic fermented in earthen vessel, obtained by the procedure outlined in Example 1 were screened for the potential to inhibit growth of *Fusarium oxysporum* f. sp. *ciceri, Fusarium oxysporum* f. sp. *gladioli, Fusarium moniliforme, Alternaria solani, Alternaria alternata, Phytophthora palmivora, Phytophthora nicotianae, Sclerotinia sclerotiorum, Sclerotium rolfsii, Colletotrichum falcatum, Colletotrichum capsici, Penicillium* sp., *Aspergillus niger, Rhizoctonia solani, Pythium aphanidermatum, Curvularia lunata* and *Phoma sorghi*, under in vitro conditions as follows: transferring an agar plug inoculum of the fungi to be tested (5-mm square) to the center of the plate individually from a source plate of the fungi on nutrient agar plates (NA), boring 4 holes of 5 mm diameter on each NA plate; adding in each hole 100 μL of the treatments were individually in 3 holes while adding sterile water in the $4^{th}$ hole as negative control; incubating plates for 5 to 8 days and selecting the treatments having the biocontrol activity which inhibited fungal growth.
5. Evaluating effect of various concentrations of neem and garlic in various combinations and amounts (gm/liter) as indicated on the product containing fermented in earthen vessel under in vitro conditions for ability to suppress *Phytophthora palmivora* and promote growth of wheat as follows: selecting amount and combination of neem and garlic demonstrating better ability to inhibit *P. palmivora* and promote plant growth of wheat, with respect to dry weight.
6. Evaluating the product containing urine+neem+garlic fermented in earthen vessel, obtained by the procedure outlined in Example 1 for its ability to inhibit growth of the sclerotia of *Sclerotium rolfsii, Rhizoctonia solani* and *Sclerotinia sclerotiorum* and chamydospores of *Fusarium* sp. under in vitro conditions as follows: dipping three-week old similar sized sclerotia/chamydospores were collected from NA plates after surface sterilized in various dilutions of the treatments individually, for 2 hrs; monitoring the viability of the sclerotia/chamydospores by removing and inoculating 3 batches of 15 sclerotia/chamydospores on NA after incubation at 25° C. for 7 days; recording the viability of sclerotia/chamydospores in terms of number of germinating sclerotia/chlamydospores by visual examination of mycelial growth after 7 days.
7. Screening of the 24 treatments, obtained by the procedure outlined in Example 1 for their ability to inhibit growth of *Sclerotium rolfsii* by seed soaking and soil drenching treatment to control collar rot of chickpea seedlings in greenhouse as follows: soaking seeds by dipping in the 10% dilution of the treatments individually, for 2 hrs; for soil drenching treatment adjusting the dry pot soil moisture to 20% with the product diluted 1:100 individually.
8. Evaluating effect of various concentrations of the product containing urine+neem+garlic fermented in earthen vessel by foliar spray treatment for its ability to control leaf spot disease of field grown betelvine caused by *Alternaria alternata* as follows: preparing one-meter wide beds with a width of 35 cm and 10 cm high ridges, planting cuttings from single node cuttings on a field plot naturally infected with *Alternaria alternata*; first spraying of the product at the time of appearance of disease symptoms followed by 5 more sprays at 15 days' interval; noting disease intensity 15 days after $5^{th}$ spray of the product.
9. Evaluating effect of addition of boiled urine+neem+garlic fermented in earthen vessel on the rhizosphere microorganisms and accumulation of N and P of chickpea plants as follows: growing chickpea plants for 4 weeks in the presence and absence of 1:10 diluted boiled urine+neem+ garlic fermented in earthen vessel; determining the dry weight, microbial population, and N and P content of the plants.

10. Elucidating effect of addition of boiled urine+neem+garlic fermented in earthen vessel on rhizosphere microorganisms of chickpea plants was evaluated by determining the percentage of bacteria among the resident population, demonstrating plant growth promotion, phosphate solubilization, abiotic stress tolerance and antagonism towards plant pathogenic fungi as follows: growing chickpea plants for 4 weeks in the presence and absence of 1:10 diluted boiled urine+neem+garlic fermented in earthen vessel; determining changes in the percentage of bacteria among the resident population demonstrating plant growth promotion, phosphate solubilization, abiotic stress tolerance and antagonism towards plant pathogenic fungi.

11. Elucidating effect of addition of boiled urine+neem+garlic fermented in earthen vessel on the total phenolic contents of chickpea plants as follows: growing chickpea plants for 4 weeks in the presence and absence of 1:10 diluted boiled urine+neem+garlic fermented in earthen vessel; determining changes in the total phenolic compounds in the leaf and root of treated chickpea was observed, compared with un-treated control.

The synergistic compositions comprising urine, neem and garlic, individually or in all possible combinations, selected by the above process have the ability of promoting plant growth and controlling plant pathogenic fungi, stimulate accumulation of N and P in the plant biomass, proliferation of plant growth promoting, phosphate solubilizing, abiotic stress tolerant and antagonists towards plant pathogenic fungi in the rhizosphere of plants, and enhances the total phenolic contents of the plants.

In accordance with this discovery, it is an object of the invention to provide synergistic compositions comprising urine, neem and garlic, individually or in all possible combinations, selected by the above process have the ability of promoting plant growth and controlling plant pathogenic fungi, stimulate accumulation of N and P in the plant biomass, proliferation of plant growth promoting, phosphate solubilizing, abiotic stress tolerant and antagonists towards plant pathogenic fungi in the rhizosphere of plants, and enhances the total phenolic contents of the plants.

It is also an object of the invention is to provide a means for screening synergistic compositions comprising urine to select those plants that have the ability of promoting plant growth and controlling plant pathogenic fungi, stimulate accumulation of N and P in the plant biomass, proliferation of plant growth promoting, phosphate solubilizing, abiotic stress tolerant and antagonists towards plant pathogenic fungi in the rhizosphere of plants, and enhances the total phenolic contents of the plants.

A further object of the invention is to provide a means for screening synergistic compositions comprising urine to select those plants that have the ability of promoting plant growth and controlling plant pathogenic fungi, stimulate accumulation of N and P in the plant biomass, proliferation of plant growth promoting, phosphate solubilizing, abiotic stress tolerant and antagonists towards plant pathogenic fungi in the rhizosphere of plants, and enhances the total phenolic contents of the plants for commercial production useful as plant and soil health enhancer for plants, seeds, and soil.

Yet another object of the invention is to provide a means for screening synergistic compositions comprising urine to select those plants that have the ability to protect plants from soil borne plant pathogens forming sclerotia/chamydospores.

Still another object of the invention is to provide a means for screening synergistic compositions comprising urine to select those plants that have the ability to protect plants by seed soaking and soil drenching treatment, from plant pathogens.

Another object of the invention is to provide a means for screening synergistic compositions comprising urine to select those plants that have the potential to protect plants as an aerial spray, from plant pathogens.

Other objectives and advantages of the invention will become apparent from the ensuing description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

It has been discovered that usage of urine from cow acts as plant and soil health enhancer. Application of cow urine results in promoting plant growth and controlling plant pathogenic fungi, said composition comprising urine, neem leaves and garlic, individually or in all possible combinations, stimulation of proliferation of plant growth promoting, phosphate solubilizing, abiotic stress tolerant and antagonists towards plant pathogenic fungi in the rhizosphere of plants and enhances the total phenolic contents of the plants.

Therefore one aspect of the present invention relates to method for screening useful synergistic compositions comprising urine to select those plants that have the potential for promoting plant growth and controlling plant pathogenic fungi, with the treatment showing stimulation of the accumulation of N and P in the plant biomass, proliferation of plant growth promoting, phosphate solubilizing, abiotic stress tolerant and antagonists towards plant pathogenic fungi in the rhizosphere of plants, and enhances the total phenolic contents of the plants.

First fresh urine from healthy indigenous (Sahiwal) cows was collected in morning into clean plastic container. The 1 liter urine was poured into 2 liter capacity copper vessel buried in soil up to its neck for its fermentation up to 30 days, along with neem (250 gm leaves/liter) and/or garlic (100 gm crushed bulbs/liter). After 30 days, using the fermented product either directly or boiling it to concentrate to 0.25 liter, before its application. In yet another combination cow urine was fermented along with neem leaves and/or crushed garlic bulbs for 30 days in 2 liter capacity earthen vessel buried in soil up to its neck. After 30 days, using the fermented product either directly or boiling it to concentrate to 0.25 liter, before its application. In yet another combination fermenting neem leaves and/or crushed garlic bulbs with water. After 30 days, using the fermented product either directly or boiling it to concentrate to 0.25 liter, before its application. Thus 12 treatments were prepared using urine, neem leaves and/or crushed garlic bulbs individually in copper or earthen pot, each, to a final total of 24 treatments. Twenty-four treatments prepared in the previous step are screened to select those, which at a particular concentration promote plant growth under greenhouse conditions as described earlier [C. S. Nautiyal, J. K Johri and H. B. Singh. Canadian Journal of Microbiology, Volume 48, pp. 588-601 (2002)]. In this test seeds of chickpea are grown in non-sterilized soil and treated individually, at a concentration of 1:100 dilution. Earthen pots (of 25 cm diameter) have been found to be of a convenient size to grow chickpea and other plants for the greenhouse test. Each pot was filled with non-sterilized soil. Although sterile soil or any other plant growth supporting material for example like vermiculite may also be used instead of non-sterile soil, it is preferred that non-sterile soil from the field where these treatments are intended to be applied is used in greenhouse test. Tap water was added to each hole before planting seeds to adjust the dry soil to 20% moisture with the 24 treatments individually diluted to 1:100. Tap water for control and diluted treatment was added before planting seeds to adjust the dry soil to 15 to 30% moisture. Preferred soil moisture is 20%. Six seeds were added per pot. Data was recorded after 21 days of plant growth with respect to plant height and weight and as plant growth promoter those treatments were selected which cause the treated plants to exhibit greater dry weight.

Next the treatment selected in the previous step is evaluated for its plant growth promotion ability of chickpea, maize, wheat and pea in greenhouse using different dilution in the range of 0 to 1:1000 and selecting those treatments, which at a particular concentration promote plant growth under greenhouse conditions as described earlier [C. S. Nautiyal, Current Microbiology, Volume 34, pp. 12-17 (1997)]. In this test seeds of chickpea, maize, wheat and pea are grown in non-sterilized soil. Trays (35×35 cm.) with 16 (4×4) places per tray (each space was of 7 cm. width, 10 cm. depth and 1 cm. apart from each other) have been found to be of a convenient size to grow chickpea, maize, wheat and pea and other plants for the greenhouse test. Each place was filled up to 8 cm. with non-sterilized soil.

Although sterile soil or any other plant growth supporting material for example like vermiculite may also be used instead of non-sterile soil, it is preferred that non-sterile soil from the field where these treatments are intended to be applied is used in greenhouse test. Data was noted after 30 days of plant growth with respect to plant height and weight and as plant growth promoter those treatments were selected which cause the treated plants to exhibit greater dry weight.

Next, the treatments urine+neem and urine+neem+garlic fermented in earthen vessel showing good plant growth promotion are subjected to a screening for their ability to suppress phytopathogenic fungi suppressing growth of *Fusarium oxysporum* f. sp. *ciceri*, *Fusarium oxysporum* f. sp. *gladioli*, *Fusarium moniliforme*, *Alternaria solani*, *Alternaria alternata*, *Phytophthora palmivora*, *Phytophthora nicotianae*, *Sclerotinia sclerotiorum*, *Sclerotium rolfsii*, *Colletotrichum falcatum*, *Colletotrichum capsici*, *Penicillium* sp., *Aspergillus niger*, *Rhizoctonia solani*, *Pythium aphanidermatum*, *Curvularia lunata* and *Phoma sorghi* under in vitro conditions as described earlier [C. S. Nautiyal (1997) Current Microbiology 35: 52-58; C. S. Nautiyal (1997) FEMS Microbiology Ecology 23: 145-158].

An agar plug inoculum of the fungi to be tested (5-mm square) was then transferred to the center of the plate individually from a source plate of the fungi. Four holes (5 mm diameter) were bored on each NA plate. In each hole 100 µL of the treatments were individually added and in the $4^{th}$ hole sterile water was added as a negative control. After incubation for 5 to 8 days inhibition zones were readily observed in the case of treatments having the biocontrol activity as the fungal growth around the hole was inhibited. While in case of treatments not having biocontrol activity and the hole sterile water was added as a negative control, fungal growth around the hole was not inhibited and the fungi grew around the edge of the hole.

Concentrations of neem (50, 100, 250 and 500 gm/liter) and garlic (10, 50, 100 and 250 gm/liter) in urine were further improved upon by using several combinations and amounts in earthen vessel under in vitro conditions for optimization of its ability to suppress pathogenic fungi and promote plant growth. Amount of neem used is in the range of 50 to 500 gm/liter and for garlic 10 to 250 gm/liter. Preferred amount for neem and garlic is 250 and 100 gm/liter, respectively.

Next the treatment containing urine+neem+garlic fermented in earthen vessel are subjected for its ability to inhibit growth of the sclerotia of *Sclerotia rolfsii*, *Rhizoctonia solani* and *Sclerotinia sclerotiorum* and chamydospores of *Fusarium* sp. under in vitro conditions by dipping three-week old similar sized sclerotia/chamydospores collected from NA plates after surface sterilized in various dilutions of the treatments individually, for up to 6 hrs; monitoring the viability of the sclerotia/chamydospores by removing and inoculating 3 batches of 15 sclerotia/chamydospores on NA after incubation at 25° C. for 7 days; recording the viability of sclerotia/chamydospores was recorded in terms of number of germinating sclerotia/chamydospores by visual examination of mycelial growth after 7 days.

The 24 treatments were further tested for their ability to inhibit growth of *Sclerotium rolfsii* by seed soaking and soil drenching treatment to control collar rot of chickpea seedlings in greenhouse by dipping in 10% dilutions of the treatments individually, as indicated for 2 hrs; for soil drenching treatment adjusting the dry pot soil moisture to 20% with the product diluted 1:100 individually, as stated.

Various concentrations of the treatment containing urine+neem+garlic fermented in earthen vessel by foliar spray treatment for its ability to control leaf spot disease of field grown plant.

Effect of addition of boiled urine+neem+garlic fermented in earthen vessel on the plant health, rhizosphere microorganisms and accumulation of N and P of chickpea plants was evaluated. Plant health and the population of rhizosphere microflora was estimated by a previously described procedure [C. S. Nautiyal, J. K Johri and H. B. Singh. Canadian Journal of Microbiology 48: 588-601 (2002)] Total N was determined by the Kjeldahl method [J. M. Bremner and C. S. Mulvancy (1982) Nitrogen-total, p. 595-624. In A. L. Page (ed.), Methods of soil analysis, part 2, $2^{nd}$ ed., Agronomy, no. 9, American Society of Agronomy, Madison, Wis., U.S.A.]. Plant tissues were digested in a mixture of 15 ml of $HClO_4$ and 5 ml of $HNO_3$ and phosphorus was determined calorimetrically by the vanado-molybdate method [H. L. S. Tandon, M. P. Cescas and E. H. Tyner (1968) Soil Science Society of America Proceedings 32: 48-51].

Next boiled urine+neem+garlic fermented in earthen vessel is added to the soil to elucidate its effect on rhizosphere microorganisms by determining the percentage of bacteria among the resident population, demonstrating plant growth promotion, phosphate solubilization, abiotic stress tolerance and antagonism towards plant pathogenic fungi. Chickpea plants were grown for 4 weeks in the presence and absence of 1:10 diluted boiled urine+neem+garlic fermented in earthen vessel.

To isolate rhizosphere bacteria chickpea roots were thoroughly washed with tap water for two minutes to remove all loosely adhering soil particles, followed by washing with sterile 0.85% (w/v) saline Milli Q water (MQW). The roots were then macerated in 0.85% saline MQW with a mortar and pestle. Serial dilutions of the homogenate were then plated on NA agar plates as described earlier [C. S. Nautiyal (1997) Current Microbiology 33: 1-6]. One thousand bacterial representatives of the predominant morphologically distinct colonies present on the plates were selected from NA plates and purified by sub culturing an individual strain on NA plates to obtain a pure culture for further screening.

Each isolate was stored in an aqueous solution of 30% glycerol at −25° C. One thousand bacterial strains were used to determine the % of gram-positive and gram-negative bacteria present in the heterogenous population of the bacteria. Out of 1000 bacterial strains 100 bacterial representatives of the predominant morphologically distinct colonies were randomly used to determine the changes in the % of bacteria among the resident population demonstrating plant growth promotion, phosphate solubilization, abiotic stress tolerance and antagonism towards plant pathogenic fungi.

Individual strains of the 100 bacteria were subjected to screening for selecting bacteria having potential for plant growth promotion. Bacterial inoculum for maize (*Zea mays*) seeds was prepared by scraping 48 h grown culture from plates with 10 ml of 0.85% saline water. Maize seeds were surface sterilized by gently shaking (80 R.P.M. on a reciprocal shaker at 28° C.) with 70% ethanol (5 min.), 20% bleach Chlorox (10 min.), followed by three rinses in sterile water. After surface sterilization seeds were soaked in the bacterial suspension ($1\times10^8$ CFU/ml) for 4 h at 28° C. on a reciprocal shaker at 100 R.P.M. Control seeds (non bacterized) were soaked in 0.85% saline water washed from uninoculated plates. Bacterization levels of seeds were determined by agitating 4 seeds from each treatment and plated after serial dilution on NA plate. Mean cfu/seed were determined by averaging the cfu/gm values of three populations in three replicates per treatment after 48 h incubation of the plates at 28° C. Tap water was added to each hole before planting seeds to adjust the soil to 15 to 30% moisture.

Preferred soil moisture is 20%. Trays (35×35 cm.) with 16 (4×4) places per tray (each space was of 7 cm. width, 10 cm. depth and 1 cm. apart from each other) were used, to grow maize. Each place was filled up to 8 cm. with non-sterilized soil. Tap water (25 ml.) was added to each hole before planting seeds to adjust the soil to 20% moisture. Four bacterized seed was added per hole. The experiment in greenhouse was carried out in four different sets of 16 maize seedlings each, for non-bacterized (control) and bacterized seeds. In each set, data of 21-days-old seedlings was noted with respect to dry weight of plants. For the bacterial strains to be plant growth promoter, the bacterized seedlings must have averaged at least 10% higher dry weight than comparable non-bacterized plants [C. S. Nautiyal, J. K Johri and H. B. Singh. Canadian Journal of Microbiology 48: 588-601 (2002)].

Quantitative estimation of phosphate solubilization capability of the 100 bacterial strains was carried out in triplicate by using National Botanical Research Institute's Phosphate solubilizing medium (NBRIP) in broth. The method has been described by Mehta and Nautiyal [S. Mehta and C. S. Nautiyal (2001) Current Microbiology 43:51-56].

Next individual strains of the 100 bacteria were subjected to screening for abiotic stress tolerance. The stress tolerance of the strains towards salt (NaCl), pH, and temperature was tested by growing them individually on nutrient broth (NB) under various stress conditions, e.g., like 6% salt (NaCl), pH (3 and 11), and at temperature (5 and 55° C.) stress were grown overnight (14-16 hrs). For 6% salt (NaCl), pH (3 and 11) stress cultures were grown overnight at 30° C. Serial dilutions of each sample were spotted (25 µl) onto NA plates, and incubated at 30° C. in triplicate as described earlier [C. S. Nautiyal, J. K Johri and H. B. Singh. Canadian Journal of Microbiology 48: 588-601 (2002)]. Growth of bacterial strains having the abiotic stress tolerance ability was clearly visible with in 2-3 days of incubation of the plates at 30° C.

Individual strains of the 100 bacteria were subjected to screening for bacteria having potential for suppressing phytopathogenic fungi namely *Fusarium oxysporum* f. sp. *ciceri*, *Colletotrichum falcatum*, *Sclerotium rolfsii*, *Alternaria solani*, *Penicillium* sp., *Pythium aphanidermatum*, *Phytophthora palmivora*, *Curvularia lunata*, *Sclerotinia sclerotiorum*, *Aspergillus niger* and *Phoma sorghi* under in vitro conditions as described earlier [C. S. Nautiyal (1997) Current Microbiology 35: 52-58]. Bacterial colonies on NA plates were streaked around the edge of a 90-mm diameter petri plate and the plates were incubated at 28° C. for 1 to 2 days. An agar plug inoculum of the fungi to be tested (5-mm square) was then transferred to the center of the plate individually from a source plate of the fungi. After incubation for 5 to 8 days inhibition zones were readily observed in the case of bacterial strains having the biocontrol activity.

Boiled urine+neem+garlic fermented in earthen vessel is added to the carriers to disperse the subject treatment such as peat, vermicompost and fermented press mud to 15 to 45% moisture. Preferred moisture is 35% before its addition to soil as seed or furrow treatments. For furrow-treatment, formulation was directly applied all over the open furrow containing seeds and covered after treatment C. S. Nautiyal, J. K Johri and H. B. Singh. Canadian Journal of Microbiology 48: 588-601 (2002)]. Chickpea plants were grown for 4 weeks to elucidate its effect on rhizosphere microorganisms as described above by determining the percentage of bacteria among the resident population, demonstrating plant growth promotion, phosphate solubilization, and antagonism towards plant pathogenic fungi.

Next effect of addition of boiled urine+neem+garlic fermented in earthen vessel was evaluated on the total phenolic contents of chickpea plants. In this test, seeds of chickpea are grown in non-sterilized soil and treated individually, at a concentration of 1:10 dilution. Earthen pots (of 25 cm diameter) have been found to be of a convenient size to grow chickpea and other plants for the greenhouse test. Each pot was filled with non-sterilized soil. Tap water was added to each hole before planting seeds to adjust the dry soil to 20% moisture with the 24 treatments individually diluted to 1:10. Tap water for control and diluted treatment was added to each hole before planting seeds to adjust the dry soil to 20%. Four seeds were added per hole. Data was noted after 30 days of plant growth with respect to total phenolic compounds in the leaf and root of treated chickpea, compared with un-treated control and total phenolics were estimated spectrophotometrically using the Prussian Blue method as modified by Graham [H. G. Graham (1992) Journal of Agriculture Food Chemistry Volume 40: 801-805].

In addition to the other properties noted above, the unexpected and surprising attributes of these synergistic compositions include the following characteristics. All the treatments have been prepared from the urine of Sahiwal cow. The treatments promote plant growth and inhibit the growth of many pathogenic fungi of plants. These treatments promote plant growth and reduce the plant disease in soil both under greenhouse and field conditions. The treatments of the present invention are capable of stimulation of the accumulation of nutrients in the plant biomass, proliferation of plant growth promoting, phosphate solubilizing, abiotic stress tolerant and antagonists towards plant pathogenic fungi in the rhizosphere of plants. Moreover the treatment enhances the total phenolic contents of the plants.

It is within the compass of the invention to composition useful as plant and soil health enhancer using cow urine along with neem and garlic and application thereof for promoting plant growth and controlling plant pathogenic fungi, said composition comprising any type of urine or plant having the ability to stimulate the accumulation of nutrients in the plant biomass, proliferation of plant growth promoting, phosphate solubilizing, abiotic stress tolerant and antagonists towards plant pathogenic fungi in the rhizosphere of plants, and enhances the total phenolic contents of the plants.

Another aspect of the invention is directed to a method of controlling plant diseases and promoting plant growth of plants in soil both under greenhouse and field conditions which have the potential as biopesticide for the biocontrol of wide host range of economically important pathogenic fungi.

The treatment can be applied directly to the seeds or plants, can be present in the soil before planting or can be distributed, e.g., by spreading, spraying or the like, over the crop or soil top or in soil furrow where the crop has been planted.

Sclerotia/chlamydospores of pathogenic fungi can be treated by treatment by soaking, or other method known in the art for applying treatment to sclerotia and chlamydospores.

Seeds can be treated by soaking with a composition containing the subject treatment by spraying with the liquid, or other method known in the art for applying treatment to seeds by well-known methods.

According to a further aspect the invention, seed-borne diseases can be prevented by soaking the seeds with treatment by spraying with the liquid, or other method known in the art for applying treatment to seeds by well-known methods.

The carriers that may be used to disperse the subject treatments would include all those commonly used for inoculating crops and would include carriers such as peat, vermicompost and fermented press mud.

According to this embodiment of the invention the optimum carrier may vary depending on the treatment used. Any of the above compositions, liquids, powders, oils or solid bases such as peat, soil, rice husk, vermiculite, caboxymethyl cellulose, peat, vermicompost, perlite, polyvinyl-pyrrolidone, and talc and the like may have nutrients included therein or and any other carrier agents. However, as demonstrated by the examples below, vermicompost and fermented press mud are preferred.

Further aspect of this invention relates to a process whereby the synergistic composition thus produced of the present invention may be used in any manner known in the art for example, including pretreatment of soil or seeds or pregerminated plant roots alone or in combination with other chemicals which is harmless to the growth and survival of bacteria for example plant growth promoting compounds, pesticides, fertilizers, peat, vermicompost, and fermented press mud.

The invention is further elaborated with the help of examples. However, the examples should not be construed to limit the scope of the invention.

EXAMPLE 1

Collection and Fermentation of Cow Urine

Fresh urine from healthy indigenous (Sahiwal) cows was collected from Gajaria farm, Department of Animal Husbandry, Government of Uttar Pradesh, Lucknow in morning into clean plastic container. One liter urine was poured into 2 liter capacity either copper or earthen pot buried in soil up to its neck. Pot was covered on top and urine was fermented at temperature of 25-35° C., for 30 days. Level of the urine in the pot was maintained by adding water as and when necessary. After 30 days, fermented product was either used directly or boiled and concentrated to 0.25 liter, before its application. In another combinations cow urine was fermented along with neem (250 gm leaves/liter) and/or garlic (100 gm crushed bulbs/liter). In yet another combinations neem leaves and/or crushed garlic bulbs were fermented with water. Like wise 12 treatments using urine, neem leaves and/or crushed garlic bulbs were individually prepared in copper or earthen pot, each, to a final total of 24 treatments.

Initial work done at Go-Vigyan Anusandhan Kendra, Deolapar, Nagpur

EXAMPLE 2

Effect of 24 Treatments on Plant Growth Promotion Ability of Chickpea in Greenhouse The experiment to examine the effect of 24 treatments on plant growth promotion ability of chickpea in greenhouse was carried out in four different sets of 30 chickpea seedlings each, for treated and non-treated seeds (control). Earthen pots (of 25 cm diameter) in the replicate of 4 were used, to grow chickpea. Each pot was filled up with non-sterilized soil. Tap water was added to each hole before planting seeds to adjust the dry soil to 20% moisture with the 24 treatments individually diluted to 1:100. Six treated seeds were added per hole. In each set, data was noted after 21 days of plant growth with respect to plant dry weight. The results are tabulated in the following Table 1. Treated plants demonstrated better plant dry weight, compared with un-treated control. Among the treated plants, boiled urine+neem fermented in earthen pot showed best results in terms of better seedling dry weight by showing 106% increase, compared with un-treated control.

TABLE 1

| S. No. | Treatment | Plant dry weight (g) |
|---|---|---|
| | Copper Vessel | |
| 1. | Urine (raw) | 0.418 |
| 2. | Urine (boiled) | 0.458 |
| 3. | Neem + water (raw) | 0.44 |
| 4. | Neem + water (boiled) | 0.491 |
| 5. | Garlic + water (raw) | 0.423 |
| 6. | Garlic + water (boiled) | 0.446 |
| 7. | Urine + neem (raw) | 0.422 |
| 8. | Urine + neem (boiled) | 0.573 |
| 9. | Urine + garlic (raw) | 0.353 |
| 10. | Urine + garlic (boiled) | 0.35 |
| 11. | Urine + neem + garlic (raw) | 0.501 |
| 12. | Urine + neem + garlic (boiled) | 0.581 |
| | Earthen Vessel | |
| 1. | Urine (raw) | 0.465 |
| 2. | Urine (boiled) | 0.486 |
| 3. | Neem + water (raw) | 0.45 |
| 4. | Neem + water (boiled) | 0.481 |
| 5. | Garlic + water (raw) | 0.416 |
| 6. | Garlic + water (boiled) | 0.486 |
| 7. | Urine + neem (raw) | 0.423 |
| 8. | Urine + neem (boiled) | 0.686 |
| 9. | Urine + garlic (raw) | 0.428 |
| 10. | Urine + garlic (boiled) | 0.504 |
| 11. | Urine + neem + garlic (raw) | 0.544 |

TABLE 1-continued

| S. No. | Treatment | Plant dry weight (g) |
|---|---|---|
| 12. | Urine + neem + garlic (boiled) | 0.654 |
|  | Control (un-treated) | 0.333 |

*Initial work done at Go-Vigyan Anusandhan Kendra, Deolapar, Nagpur

It was discovered that treated plants demonstrated better plant dry weight, compared with un-treated control. Among the treated plants, boiled urine + neem fermented in earthen pot showed best results in terms of better seedling dry weight, compared with un-treated control.

EXAMPLE 3

Effect of Different Dilution of Boiled Urine+Neem Fermented in Earthen Vessel on Plant Growth Promotion Ability of Chickpea, Maize, Wheat and Pea in Greenhouse The experiment to examine the effect of boiled urine+neem fermented in earthen vessel as described in Example 1, on plant growth promotion ability of chickpea (*Cicer arietinum*), maize (*Zea mays*), wheat (*Triticum vulgare*) and pea (*Pisum sativum*) in greenhouse was carried out. Trays (35×35 cm.) with 16 (4×4) places per tray (each space was of 7 cm. width, 10 cm. depth and 1 cm. apart from each other) were used, to grow chickpea, maize, wheat and pea. Each place was filled up to 8 cm. with non-sterilized soil. Tap water was added to each hole before planting seeds to adjust the dry soil to 20% moisture with the product diluted as stated. Four seeds were added per hole. The experiment in greenhouse was carried out in four different sets of 16 chickpea, maize, wheat and pea seedlings each, for non-treated (control) and treated seeds. In each set, data of 30-days-old seedlings was noted with respect to dry weight of plants. Results demonstrated that 1:10 dilution of the product urine+neem fermented in earthen vessel treated plants demonstrated best plant dry weight, compared with un-treated control, followed by 1:100 dilution (Table 2).

TABLE 2

| | Plant dry weight (mg) | | |
|---|---|---|---|
| Treatment | n-treated control | Treated | % increase over control |
| Chickpea | | | |
| Direct | 116 | 76 | −34.5 |
| 1:10 dilution | 116 | 223 | 92.2 |
| 1:100 dilution | 116 | 195 | 68.1 |
| 1:1000 dilution | 116 | 124 | 6.8 |
| Maize | | | |
| Direct | 235 | 108 | −54.0 |
| 1:10 dilution | 235 | 436 | 85.5 |
| 1:100 dilution | 235 | 374 | 59.1 |
| 1:1000 dilution | 235 | 261 | 11.0 |
| Wheat | | | |
| Direct | 35 | 14 | −60.0 |
| 1:10 dilution | 35 | 75 | 114.2 |
| 1:100 dilution | 35 | 63 | 80.0 |
| 1:1000 dilution | 35 | 38 | 8.5 |
| Pea | | | |
| Direct | 90 | 53 | −41.1 |
| 1:10 dilution | 90 | 124 | 37.7 |
| 1:100 dilution | 90 | 114 | 26.6 |
| 1:1000 dilution | 90 | 92 | 2.2 |

It was discovered that 1:10 dilution of the product urine + neem fermented in earthen vessel treated plants demonstrated best plant dry weight, compared with un-treated control, followed by 1:100 dilution.

EXAMPLE 4

Effect of Product Containing Urine+Neem and Urine+Neem+Garlic Fermented in Earthen Vessel Under In Vitro Conditions for Ability to Suppress Wide Range of Plant Pathogenic Fungi The treatments urine+neem and urine+neem+garlic fermented in earthen vessel, obtained by the procedure outlined in Example 1 were screened for their ability to inhibit growth of *Fusarium oxysporum* f. sp. *ciceri, Fusarium oxysporum* f. sp. *gladioli, Fusarium moniliforme, Alternaria solani, Alternaria alternata, Phytophthora palmivora, Phytophthora nicotianae, Sclerotinia sclerotiorum, Sclerotium rolfsii, Colletotrichum falcatum, Colletotrichum capsici, Penicillium* sp., *Aspergillus niger, Rhizoctonia solani, Pythium aphanidermatum, Curvularia lunata* and *Phoma sorghi* under in vitro conditions as follows: An agar plug inoculum of the fungi to be tested (5-mm square) was transferred to the center of the plate.

Four holes (5 mm diameter) were bored on each NA plate. In each hole 100 μL of the treatments were individually added and in the $4^{th}$ hole sterile water was added as a negative control. In each hole 100 μL of the products from 24 treatments were individually added. After incubation for 7 days inhibition zones were readily observed in the case of treatments having the biocontrol activity as the fungal growth around the hole was inhibited. While in case of treatments not having biocontrol activity, fungal growth around the hole was not inhibited and the fungi grew around the edge of the hole (Table 3). It was elucidated that the product containing urine+neem+garlic fermented in earthen vessel demonstrated better ability to inhibit wide range pathogenic fungi, under in vitro conditions, compared with the urine+neem product fermented in earthen vessel, indicating its potential as biopesticide for the biocontrol of wide range of economically important pathogenic fungi.

TABLE 3

| | Zone of inhibition (mm) | |
|---|---|---|
| Fungi | Urine + neem | Urine + neem + garlic |
| *Fusarium oxysporum* f. sp. *ciceri* | 20 | 24 |
| *Fusarium oxysporum* f. sp. *gladioli* | 7 | 10 |
| *Fusarium moniliforme* | 5 | 13 |
| *Alternaria solani* | 21 | 26 |
| *Alternaria alternata* | 14 | 21 |
| *Phytophthora palmivora* | 7 | 10 |
| *Phytophthora nicotianae* | 8 | 10 |
| *Sclerotinia sclerotiorum* | 16 | 23 |
| *Sclerotium rolfsii* | 7 | 11 |
| *Colletotrichum falcatum* | 15 | 23 |
| *Colletotrichum capsici* | 13 | 20 |

TABLE 3-continued

| | Zone of inhibition (mm) | |
|---|---|---|
| Fungi | Urine + neem | Urine + neem + garlic |
| *Penicillium* sp. | 14 | 22 |
| *Aspergillus niger* | —* | 4 |
| *Rhizoctonia solani* | 3 | 8 |
| *Pythium aphanidermatum* | 5 | 7 |
| *Curvularia lunata* | — | 3 |
| *Phoma sorghi* | 2 | 4 |

—* = No inhibition zone.

It was discovered that the product containing urine + neem + garlic fermented in earthen vessel demonstrated better ability to inhibit wide range pathogenic fungi, under in vitro conditions, compared with urine + neem fermented in earthen vessel. Therefore the use of product has the potential as biopesticide for the biocontrol of wide host range of economically important pathogenic fungi.

EXAMPLE 5

Effect of Various Concentration of Neem and Garlic on the Product Containing Fermented in Earthen Vessel Under In Vitro Conditions for Ability to Suppress *Phytophthora palmivora* and Promote Growth of Wheat Effect of various concentrations of neem and garlic in various combinations and amounts (gm/liter) as indicated in Table 4 on the product containing fermented in earthen vessel under in vitro conditions for ability to suppress *Phytophthora palmivora* was evaluated as follows: An agar plug inoculum of the *P. palmivora* (5-mm square) was transferred to the center of the plate. Four holes (5 mm diameter) were bored on each NA plate. In each hole 100 μL of the treatments were individually added and in the 4$^{th}$ hole sterile water was added as a negative control. While in case of treatments not having biocontrol activity and the hole sterile water was added as a negative control, fungal growth around the hole was not inhibited and the fungi grew around the edge of the hole. In each hole 100 μL of the products from 24 treatments were individually added. After incubation for 5 days inhibition zones were readily observed in the case of treatments having the biocontrol activity as the fungal growth around the hole was inhibited. While in case of treatments not having biocontrol activity, *P. palmivora* growth around the hole was not inhibited and the fungi grew around the edge of the hole (Table 4).

The experiment in greenhouse was carried out in four different sets of 16 wheat seedlings each, for non-treated (control) and treated seeds as described in Example 3 using 1:100 dilution of the treatments, individually. It was elucidated that the product containing urine+neem (500 gm)+garlic (100 gm) and urine+neem (500 gm)+garlic (250 gm) fermented in earthen vessel demonstrated better ability to inhibit *P. palmivora*, under in vitro conditions, compared with urine+neem (250 gm)+garlic (100 gm). There was not much difference among the treatments [Urine+neem (250 gm)+garlic (100 gm) and Urine+neem (500 gm)+garlic (100 gm)] with respect to dry weight of wheat. Growth of wheat was 37% more in the presence of Urine+neem (250 gm)+garlic (250 gm), compared with 80% more in Urine+neem (250 gm)+garlic (100 gm) and 83% more in Urine+neem (500 gm)+garlic (100 gm) treatments, compared with untreated wheat plants.

TABLE 4

| Treatment | Zone of inhibition (mm) | Wheat dry weight (mg)* |
|---|---|---|
| Urine + neem (50 gm) + garlic (100 gm) | 5 | 56 |
| Urine + neem (100 gm) + garlic (100 gm) | 7 | 58 |
| Urine + neem (250 gm) + garlic (100 gm) | 10 | 63 |
| Urine + neem (500 gm) + garlic (100 gm) | 13 | 64 |
| Urine + neem (250 gm) + garlic (10 gm) | 8 | 52 |
| Urine + neem (250 gm) + garlic (50 gm) | 9 | 56 |
| Urine + neem (250 gm) + garlic (250 gm) | 11 | 48 |

¶Initial work done at Go-Vigyan Anusandhan Kendra, Deolapar, Nagpur
*Untreated wheat dry weight 35 mg/plant.

It was discovered that the product containing urine + neem (500 gm) + garlic (100 gm) and urine + neem (500 gm) + garlic (250 gm) fermented in earthen vessel demonstrated better ability to inhibit *P. palmivora*, under in vitro conditions, compared with urine + neem (250 gm) + garlic (100 gm). However, in view of the cost of the material involved and dry weight of wheat seedlings, product consisting of urine + neem (250 gm) + garlic (100 gm) was used for further work.

EXAMPLE 6

Effect of Various Concentrations of the Product Containing Urine+Neem+Garlic Fermented in Earthen Vessel for Ability to Inhibit Growth of the Sclerotia of *Sclerotium rolfsii, Rhizoctonia solani* and *Sclerotinia sclerotiorum* and Chamydospores of *Fusarium* sp. Under In Vitro Conditions The product containing urine+neem+garlic fermented in earthen vessel, obtained by the procedure outlined in Example 1 was screened for its ability to inhibit growth of the sclerotia of *Sclerotium rolfsii, Rhizoctonia solani* and *Sclerotinia sclerotiorum* and chamydospores of *Fusarium* sp. under in vitro conditions as follows: Three-weeks old similar sized sclerotia/chamydospores collected from NA plates were surface sterilized and dipped in the treatment individually, as indicated for up to 6 hrs. In the control set the sclerotia/chamydospores were suspended in sterile distilled water. The viability of the sclerotia/chamydospores was monitored by removing and inoculating 3 batches of 15 sclerotia/chamydospores on NA after incubation at 28° C. for 7 days. Viability of sclerotia/chamydospores was recorded in terms of number of germinating sclerotia/chamydospores by visual examination of mycelial growth after 7 days. After incubation for 7 days mycelial growth was readily visible in the case of treatments does not having biocontrol activity, as fungal growth around the sclerotia was not inhibited and mycelia grew around the sclerotia on the plate (Table 5). On the contrary after incubation for 7 days mycelial growth was not visible in the case of treatments having biocontrol activity, as fungal growth around the sclerotia was inhibited and mycelia did not grew around the sclerotia on the plate (Table 5). Product containing urine+neem+garlic fermented in earthen vessel demonstrated that sclerotia of *Sclerotium rolfsii, Rhizoctonia solani* and *Sclerotinia sclerotiorum* and chamydospores of *Fusarium* sp. was inhibited in 4, 2, 4 and 2 hrs respectively, under in vitro conditions.

TABLE 5

| Pathogen | Dipping time (hrs) | Viability of sclerotia/chlamydospores (%) |
|---|---|---|
| *Sclerotium rolfsii* | 0 | 100 |
| | 2 | 17 |
| | 4 | 0 |
| | 6 | 0 |

TABLE 5-continued

| Pathogen | Dipping time (hrs) | Viability of sclerotia/chlamydospores (%) |
|---|---|---|
| Rhizoctonia solani | 0 | 100 |
|  | 2 | 0 |
|  | 4 | 0 |
|  | 6 | 0 |
| Sclerotinia sclerotiorum | 0 | 100 |
|  | 2 | 23 |
|  | 4 | 0 |
|  | 6 | 0 |
| Fusarium sp. | 0 | 100 |
|  | 2 | 0 |
|  | 4 | 0 |
|  | 6 | 0 |

It was discovered that the product containing urine + neem + garlic fermented in earthen vessel inactivated sclerotia/chlamydospores under in vitro conditions. Therefore the use of product has the potential to protect plants from soil borne plant pathogens forming sclerotia/chlamydospores.

EXAMPLE 7

Effect of Various Concentrations of 24 Treatments by Seed Soaking and Soil Drenching Treatment to Control Collar Rot of Chickpea Seedlings in Green House Caused by *Sclerotium rolfsii*

The 24 treatments, obtained by the procedure outlined in Example 1 were screened for their ability to inhibit growth of *S. rolfsii* by seed soaking and soil drenching treatment to control collar rot of chickpea seedlings in green house as follows: For seed soaking treatment seeds were treated by dipping in 10% dilutions of the treatments individually, as indicated for 2 hrs. For soil drenching treatment the dry pot soil was adjusted to 20% moisture with the product diluted 1:100 individually, as stated. Products containing urine+neem+garlic fermented both in copper or earthen vessel, and used as soil drenching method, demonstrated best biocontrol activity against *S. rolfsii* under in vitro conditions, as 0% mortality was observed.

TABLE 6

| S. No. | Treatment | Seeds soaking % mortality | Soil drenching % mortality |
|---|---|---|---|
| | Copper Vessel | | |
| 1. | Urine (raw) | 44.37 | 24.39 |
| 2. | Urine (boiled) | 44.37 | 24.39 |
| 3. | Neem + water (raw) | 100 | 100 |
| 4. | Neem + water (boiled) | 100 | 100 |
| 5. | Garlic + water (raw) | 100 | 100 |
| 6. | Garlic + water (boiled) | 100 | 100 |
| 7. | Urine + neem (raw) | 24.39 | 100 |
| 8. | Urine + neem (boiled) | 44.37 | 24.39 |
| 9. | Urine + garlic (raw) | 24.39 | 24.39 |
| 10. | Urine + garlic (boiled) | 24.39 | 100 |
| 11. | Urine + neem + garlic (raw) | 44.37 | 24.39 |
| 12. | Urine + neem + garlic (boiled) | 69.37 | 0 |
| | Earthen Vessel | | |
| 1. | Urine (raw) | 44.37 | 24.39 |
| 2. | Urine (boiled) | 44.37 | 24.39 |
| 3. | Neem + water (raw) | 100 | 100 |
| 4. | Neem + water (boiled) | 100 | 100 |
| 5. | Garlic + water (raw) | 100 | 100 |
| 6. | Garlic + water (boiled) | 100 | 100 |
| 7. | Urine + neem (raw) | 24.39 | 100 |
| 8. | Urine + neem (boiled) | 24.39 | 100 |
| 9. | Urine + garlic (raw) | 24.39 | 100 |
| 10. | Urine + garlic (boiled) | 24.39 | 100 |

TABLE 6-continued

| S. No. | Treatment | Seeds soaking % mortality | Soil drenching % mortality |
|---|---|---|---|
| 11. | Urine + neem + garlic (raw) | 44.37 | 24.39 |
| 12. | Urine + neem + garlic (boiled) | 24.39 | 0 |
| | Control | 100 | 100 |

It was discovered that the products containing urine + neem + garlic fermented both in copper or earthen vessel, and used as soil drenching method, demonstrated best biocontrol activity against *S. rolfsii* under in vitro conditions. Therefore the use of product has the potential to protect plants by seed soaking and soil drenching treatment, from plant pathogens.

EXAMPLE 8

Effect of Various Concentrations of the Product Containing Urine+Neem+Garlic Fermented in Earthen Vessel by Foliar Spray Treatment to Control Leaf Spot Disease of Field Grown Betelvine Caused by *Alternaria alternata*

The product containing urine+neem+garlic fermented in earthen vessel, obtained by the procedure outlined in Example 1 was screened for its ability to control leaf spot disease of field grown betelvine caused by *Alternaria alternata* as follows: The field experiment for management of leaf spot disease of betelvine with the help of various concentrations of the product containing urine+neem+garlic fermented in earthen vessel was conducted in the conservatory at the National Botanical Research Institute, Lucknow, India in a randomized block design. The conservatory in which the experiments were carried out was about 5 meter high and covered on all the sides with wire nettings supported on angled iron pillars. Paddy straw was used on these nettings to provide suitable conditions of shade and moisture needed for betelvine cultivation. One-meter wide beds were prepared with a width of 35 cm and 10 cm high ridges. The sets for sowing were selected from single node cuttings from two year old vines growing in beds of 4.5×3 m² area.

The cuttings were planted on either side of the ridges in April 2001, on a field plot naturally infected with *Alternaria alternata* and covered with paddy straw and sprinkled with water 4-5 times a day for nearly one month creating suitable moisture conditions for the proper germination of vines. In each bed 15 vines of the plants were maintained for each treatment. Disease symptoms on lower leaves were visible by July, 2001. First spraying of the product was done at that time and was repeated by 5 more sprays at 15 days' interval till September, 2001. Disease intensity was noted 15 days after 5$^{th}$ spray of the product. The products containing urine+neem+garlic fermented in earthen vessel demonstrated ability to control leaf spot disease of field grown betelvine caused by *Alternaria alternata* at 20% concentration.

TABLE 7

| Concentrations used (%) | % Disease intensity |
|---|---|
| 5 | 20 |
| 10 | 9 |
| 15 | 4 |

TABLE 7-continued

| Concentrations used (%) | % Disease intensity |
| --- | --- |
| 20 | 0 |
| Control (Water spray only) | 47 |

It was discovered that the products containing urine + neem + garlic fermented in earthen vessel demonstrated ability to control leaf spot disease of field grown betelvine caused by *Alternaria alternata* at 20% concentration. Therefore the use of product has the potential to protect plants as an aerial spray from plant pathogens.

EXAMPLE 9

Effect of Addition of Boiled Urine+Neem+Garlic Fermented in Earthen Vessel on the Rhizosphere Microorganisms, Growth and Nutrient Accumulation of Chickpea Plants Effect of addition of 1:10 diluted product containing urine+neem+garlic fermented in earthen vessel, obtained by the procedure outlined in Example 1, on the rhizosphere microorganisms of chickpea plants was evaluated 4 weeks after planting as described in Example 2. Dry weight of the treated plants was higher than that of control plants. Reduction in the counts of treated microorganisms in the chickpea rhizosphere was observed, compared with un-treated control. Bacterial population reduced by 1 log unit, followed by reduction of 0.6 and 0.3 log unit of fungal and actinomycetes. Table 8 shows stimulation of the accumulation of N and P in the biomass of chickpea plants.

TABLE 8

| Microorganisms and nutrient accumulation in chickpea plants | Treatment | |
| --- | --- | --- |
| | Control | Treated |
| Dry weight (mg) | 310 | 450 |
| Bacteria (Log$_{10}$ CFU/g of soil) | 7.7 | 6.5 |
| Actinomycetes (Log$_{10}$ CFU/g of soil) | 5.2 | 4.9 |
| Fungi (Log$_{10}$ CFU/g of soil) | 4.8 | 4.2 |
| N (mg/gm dry matter) | 14.8 | 20.8 |
| P (mg/gm dry matter) | 2.1 | 2.8 |

Results demonstrate influence of boiled urine + neem + garlic fermented in earthen vessel on the rhizosphere microorganisms. Therefore the use of product has the potential as an effective agent to change the composition of soil microorganisms and stimulation of the accumulation of nutrients in the biomass of plants.

EXAMPLE 10

Effect of Addition of Boiled Urine+Neem+Garlic Fermented in Earthen Vessel on the Percentage of Rhizosphere Microorganisms of Chickpea Plants Demonstrating Plant Growth Promotion, Phosphate Solubilization, Abiotic Stress Tolerance and Antagonism Towards Plant Pathogenic Fungi Effect of addition of 1:10 diluted product containing urine+neem+garlic fermented in earthen vessel, obtained by the procedure outlined in Example 1, on rhizosphere microorganisms of 4 weeks old chickpea plants was evaluated by determining the percentage of bacteria among the resident population, demonstrating plant growth promotion, phosphate solubilization, abiotic stress tolerance and antagonism towards plant pathogenic fungi. Changes in the percentage of bacteria among the resident population, demonstrating plant growth promotion, phosphate solubilization, abiotic stress tolerance and antagonism towards plant pathogenic fungi of treated microorganisms in the chickpea rhizosphere was observed, compared with un-treated control.

Percentage of gram-positive bacteria increased and that of gram-negative bacteria decreased in the treated chickpea rhizosphere, compared with un-treated control. Percentage of plant growth promotery and phosphate solubilizers and abiotic stress tolerant bacteria increased in the treated chickpea rhizosphere, compared with un-treated control. Except for *Curvularia lunata* and *Aspergillus niger* percentage of plant pathogenic fungal antagonistic bacteria against *Fusarium oxysporum* f. sp. *ciceri*, *Colletotrichum falcatum*, *Sclerotium rolfsii*, *Alternaria solani*, *Penicillium* sp., *Pythium aphanidermatum*, *Phytophthora palmivora*, *Sclerotinia sclerotiorum* and *Phoma sorghi* increased in the treated chickpea rhizosphere, compared with un-treated control.

TABLE 9

| | % of rhizosphere bacteria Microorganisms | |
| --- | --- | --- |
| | Control | Treated |
| Gram-positive bacteria | 35 | 48 |
| Gram-negative bacteria | 65 | 52 |
| Plant growth promotion | 18 | 24 |
| Phosphate solubilizers | 13 | 28 |
| Abiotic stress tolerance | | |
| Salt (6% NaCl) | 17 | 22 |
| pH (3) | 25 | 36 |
| pH (11) | 55 | 70 |
| Temperature (5° C.) | 21 | 42 |
| Temperature (55° C.) | 32 | 55 |
| Drought (60% PEG) | 28 | 37 |
| Antagonism towards | | |
| *Fusarium oxysporum* f. sp. *ciceri* | 7 | 12 |
| *Colletotrichum falcatum* | 15 | 26 |
| *Sclerotium rolfsii* | 12 | 16 |
| *Alternaria solani* | 24 | 56 |
| *Penicillium* sp. | 20 | 38 |
| *Pythium aphanidermatum* | 13 | 17 |
| *Phytophthora palmivora* | 16 | 21 |
| *Curvularia lunata* | 5 | 5 |
| *Sclerotinia sclerotiorum* | 28 | 43 |
| *Aspergillus niger* | 6 | 6 |
| *Phoma sorghi* | 8 | 11 |

It was discovered that addition of boiled urine + neem + garlic fermented in earthen vessel (on rhizosphere microorganisms of chickpea plants, resulted in stimulation of proliferation of plant growth promoting, phosphate solubilizing, abiotic stress tolerant and antagonists towards plant pathogenic fungi in the rhizosphere of plants. Therefore the use of product has the potential to promote plant growth and protect plants from plant pathogens.

EXAMPLE 11

Effect of Addition of Boiled Urine+Neem+Garlic Fermented in Earthen Vessel on the Percentage of Rhizosphere Microorganisms of Chickpea Plants Demonstrating Plant Growth Promotion, Phosphate Solubilization and Antagonism Towards Plant Pathogenic Fungi in the Presence of Peat, Vermicompost, Fermented Press Mud Used as Carrier and Applied as Furrow Treatments Effect of addition of the product containing urine+neem+garlic fermented in earthen vessel, obtained by the procedure outlined in Example 1, on the carriers to disperse the subject treatment such as peat, vermicompost and press mud to 35% moisture and applied as furrow treatment. For furrow-treatment, formulation was directly applied all over the open furrow containing seeds and covered after treatment. Chickpea plants were grown for 4 weeks to elucidate its effect on rhizosphere microorganisms as described above by determining the percentage of bacteria among the resident population, demonstrating plant growth promotion, phosphate solubilization, and antagonism towards plant pathogenic fungi. Changes in the percentage of bacteria among the resident population, demonstrating plant growth promotion, phosphate solubilization and antagonism towards plant pathogenic fungi of treated microorganisms in the chickpea rhizosphere was observed, compared with un-treated control. As indicated in the Table 10, except for peat % population of plant growth promotery, phosphate solubilizers and fungal antagonist bacterial population increased in the treated chickpea rhizosphere, compared with control (without carrier).

TABLE 10

| Carrier | % of rhizosphere bacteria |
|---|---|
| No carrier | |
| Plant growth promotion | 21 |
| Phosphate solubilizers | 24 |
| Antagonism towards | |
| *Fusarium oxysporum* f. sp. *ciceri* | 14 |
| *Colletotrichum falcatum* | 22 |
| *Alternaria solani* | 48 |
| *Penicillium* sp. | 32 |
| Peat | |
| Plant growth promotion | 20 |
| Phosphate solubilizers | 22 |
| Antagonism towards | |
| *Fusarium oxysporum* f. sp. *ciceri* | 13 |
| *Colletotrichum falcatum* | 20 |
| *Alternaria solani* | 38 |
| *Penicillium* sp. | 30 |
| Vermicompost | |
| Plant growth promotion | 28 |
| Phosphate solubilizers | 32 |
| Antagonism towards | |
| *Fusarium oxysporum* f. sp. *ciceri* | 16 |
| *Colletotrichum falcatum* | 30 |
| *Alternaria solani* | 52 |
| *Penicillium* sp. | 41 |
| Fermented press mud | |
| Plant growth promotion | 36 |
| Phosphate solubilizers | 40 |
| Antagonism towards | |
| *Fusarium oxysporum* f. sp. *ciceri* | 21 |
| *Colletotrichum falcatum* | 32 |
| *Alternaria solani* | 62 |
| *Penicillium* sp. | 46 |

¶Work done in collaboration with Go-Vigyan Anusandhan Kendra, Deolapar, Nagpur
It was discovered that addition of boiled urine + neem + garlic fermented in earthen vessel on rhizosphere microorganisms of chickpea plants, except for peat, along with vermicompost and press mud resulted in stimulation of proliferation of plant growth promoting, phosphate solubilizing bacteria, antagonists towards plant pathogenic fungi in the rhizosphere of plants. Therefore the use of product along with carriers has the potential to promote plant growth and protect plants from plant pathogens.

EXAMPLE 12

Effect of Addition of Boiled Urine+Neem+Garlic Fermented in Earthen Vessel on the Phenolic Contents of Chickpea Plants Effect of addition of 1:10 diluted product containing urine+neem+garlic fermented in earthen vessel, obtained by the procedure outlined in Example 1, on the total phenolic contents of chickpea plants was evaluated 4 weeks after planting. Increase in the total phenolic compounds in the leaf and root of treated chickpea was observed, compared with un-treated control.

TABLE 11

| | Total phenolic compounds (mM/gm fresh weight) | |
|---|---|---|
| Plant | Control | Treated |
| Leaf | 35 | 78 |
| Root | 5 | 11 |

Results demonstrate influence of boiled urine + neem + garlic fermented in earthen vessel on the total phenolic contents of the chickpea plants. Therefore the use of product has the potential as an effective agent to enhance the total phenolic contents of the plants. Greater accumulation of phenolic compounds or mediated induced systemic resistance (ISR) in hosts offer a practical way of immunizing plants against pathogen ingress It is understood that the foregoing detailed description is given merely by way of illustration and that modification and variations may be made therein without departing from the spirit and scope of the invention.

The invention claimed is:

1. A synergistic fermented composition useful in promoting plant growth, soil health and bio-controlling, said composition obtained by fermenting a combination comprising bovine urine, crushed neem leaves of concentration ranging between 10 to 750 grams/liter of bovine urine, and crushed garlic bulbs of concentration ranging between 1 to 500 grams/liter of bovine urine, optionally along with one or more carriers.

2. A synergistic composition as claimed in claim 1, wherein the concentration of the neem leaves is 250 grams/liter of bovine urine.

3. A synergistic composition as claimed in claim 1, wherein the concentration of the crushed garlic bulbs is 100 grams/liter of bovine urine.

4. A synergistic composition as claimed in claim 1, wherein the bovine urine is fresh bovine urine.

5. A synergistic composition as claimed in claim 1, wherein the bovine urine is cow urine.

6. A synergistic composition as claimed in claim 1, wherein the carrier is selected from the group consisting of vermicompost, soil, peat, rice husk, vermiculite, carboxymethyl cellulose, perlite, polyvinyl-pyrrolidone, talc, and fermented press mud.

7. A synergistic composition as claimed in claim 1, wherein the carrier is vermicompost or fermented press mud.

8. A synergistic composition as claimed in claim 1, wherein the concentration of the carrier is between 10 to 1000 grams/liter of bovine urine.

9. A process of preparing synergistic fermented composition comprising bovine urine, crushed neem leaves and crushed garlic bulbs, optionally along with one or more carriers, useful in promoting plant growth, said process comprising steps of:

a) collecting fresh urine from healthy bovine to provide bovine urine, b) adding crushed neem leaves and crushed garlic bulbs to provide a resultant mixture, wherein the concentration of the crushed neem leaves is between 10 to 750 grams/liter of said bovine urine and the concentration of the crushed garlic bulbs is between 1 to 500 grams/liter of said bovine urine, c) fermenting the resultant mixture to obtain the synergistic composition, and d) optionally, adding one or more carriers to the synergistic composition.

10. A process as claimed in claim 9, wherein the concentration of the crushed neem leaves is 250 grams/liter of said bovine urine.

11. A process as claimed in claim 9, wherein the concentration of the crushed garlic bulbs is 100 grams/liter of said bovine urine.

12. A process as claimed in claim 9, wherein the bovine is cow.

13. A process as claimed in claim 9, wherein the resultant mixture is fermented for about 30 days.

14. A process as claimed in claim 9, wherein the carrier is selected from the group consisting of vermicompost, soil, peat, rice husk, vermiculite, carboxymethyl cellulose, perlite, polyvinyl-pyrrolidone, talc, and fermented press mud.

15. A process as claimed in claim 9, wherein the carrier is vermicompost or fermented press mud.

16. A process as claimed in claim 9, wherein the concentration of the carrier is between 10 to 1000 grams/liter of said bovine urine.

* * * * *